US007278678B2

(12) United States Patent
Martin

(10) Patent No.: US 7,278,678 B2
(45) Date of Patent: Oct. 9, 2007

(54) REAR DOOR CAB FOR LIFT TRUCK

(75) Inventor: Robert P. Martin, Fairview Park, OH (US)

(73) Assignee: Martin Sheet Metal, Inc., Cleveland, OH (US)

( * ) Notice: Subject to any disclaimer, the term of this patent is extended or adjusted under 35 U.S.C. 154(b) by 29 days.

(21) Appl. No.: 11/229,809

(22) Filed: Sep. 19, 2005

(65) Prior Publication Data

US 2007/0063545 A1 Mar. 22, 2007

(51) Int. Cl.
*B60J 1/04* (2006.01)
*B60J 5/04* (2006.01)
*B60R 21/13* (2006.01)

(52) U.S. Cl. .......................... 296/190.04; 296/190.08; 296/146.8; 296/102; 296/190.11; 280/756

(58) Field of Classification Search ........... 296/190.01, 296/190.03, 190.04, 190.08, 102, 190.11, 296/190.1, 146.8, 146.16, 201, 208
See application file for complete search history.

(56) References Cited

U.S. PATENT DOCUMENTS

| | | | | | |
|---|---|---|---|---|---|
| 2,806,618 | A | | 9/1957 | Cook | |
| 3,881,769 | A | * | 5/1975 | Metzke | 296/190.08 |
| 4,018,473 | A | * | 4/1977 | Chalupsky | 296/190.04 |
| 4,050,735 | A | * | 9/1977 | Molnar | 296/102 |
| 4,072,338 | A | * | 2/1978 | Lawrence et al. | 296/190.1 |
| 4,630,700 | A | * | 12/1986 | Larsson | 180/89.13 |
| 4,652,037 | A | | 3/1987 | Thau et al. | |
| 6,065,799 | A | | 5/2000 | Suwabe et al. | |
| 6,102,471 | A | * | 8/2000 | Sasser et al. | 296/190.05 |
| 6,189,954 | B1 | | 2/2001 | Martin, Jr. | |
| 6,220,656 | B1 | | 4/2001 | Martin, Jr. | |
| 6,419,303 | B1 | * | 7/2002 | Fleming | 296/190.01 |
| 2003/0168286 | A1 | | 9/2003 | Brown | |

* cited by examiner

*Primary Examiner*—D. Glenn Dayoan
*Assistant Examiner*—Greg Blankenship
(74) *Attorney, Agent, or Firm*—Pearne & Gordon LLP

(57) ABSTRACT

A lift truck cab having front, side, and rear faces, and a roof, mounting structure attached to the roof for suspending the cab from a mast of the lift truck in a manner that permits the front and side faces when installed on the truck to be hung in the manner of curtains without the necessity of direct fastening of lower portions of the front and side faces to the chassis/body of the truck. The cab construction affords generous operator space, high visibility, a convenient electrical raceway and ready access to truck control circuitry.

9 Claims, 5 Drawing Sheets

REAR DOOR CAB FOR LIFT TRUCK

BACKGROUND OF THE INVENTION

The invention relates to lift truck cabs and, in particular, to cabs for lift trucks designed for rear ingress and egress by the operator.

PRIOR ART

Lift trucks designed for general utility are often used in freezer environments. For operator comfort and increased productivity, it is desirable that the lift truck be fitted with a heated cab so that the operator can more readily endure the cold environment. It is axiomatic that productivity can be improved when a heated cab is available since the need for warm-up periods for the operator during a work shift can be reduced or eliminated.

Lift trucks are largely designed primarily for use in moderate environments and climates and consideration of cab integration can be limited so that later cab design can be complicated and/or difficult. Current chassis/body design of material handling trucks frequently emphasizes a "soft" look that avoids angular shapes and favors generous curves on the exterior of the chassis/body.

In large warehouse applications and, particularly, in commercial freezer buildings, floor space for goods is maximized and paths or aisles for material handling trucks are minimized. This translates into truck designs that must be compact to fit the allotted aisle clearances. It can be difficult to construct a cab for a compact truck because the area allotted to the operator is deliberately minimized and add-on cab structure seemingly must encroach on the operator's space. A continuing factor in the design of a lift truck cab is that the safety requirements for protecting the operator from falling objects must be met.

SUMMARY OF THE INVENTION

The invention involves a cab for a lift truck that is especially suited for compact or narrow aisle units where the operator stands or leans on a seat of limited size. The disclosed cab has its sides constructed as curtains suspended from an overhead guard which, in turn, is suspended from the truck mast. The curtain-like construction of the cab where the weight of the side panels is largely supported from above, greatly reduces the time and complexity of installation of the cab. For the most part, modification of the chassis/body upon installation of the cab is largely eliminated and only a limited number of bolts are required to accomplish the assembly procedure.

The cab follows the convention of a walk-on rear entry to the operator station typically used in narrow isle truck designs. A full height door closes the entry to the operator station. The door is framed by a unique door jamb that can strengthen the overhead guard structure by vertically supporting the guard from a plane spaced considerably rearwardly of the mast. A threshold, forming part of the door jamb, is conveniently attached to a lower rear face of the truck chassis/body. The threshold is configured with a cantilevered geometry that advantageously adds space to the cab interior. The side panels, for the most part, comprise steel sheet stock to which is mounted transparent window material. The side panels are wrapped about generally vertical lines to avoid angular corners and to stiffen the panels so that space robbing heavy structural posts and horizontal box-like frame members can be avoided. A front windshield panel, bolted directly to the front face of the cab leaves the operator with generous space while allowing ready replaceability of this important component. The overhead or curtain suspension of the cab leaves the lower front panel free of fasteners or direct support from the chassis/body. This structural separation allows a panel that closes the lower front of the cab to be flipped up out of its closed position for immediate access to the circuitry that controls the truck functions for diagnosis, service and/or repair.

DESCRIPTION OF THE PREFERRED EMBODIMENT

Figure 1:
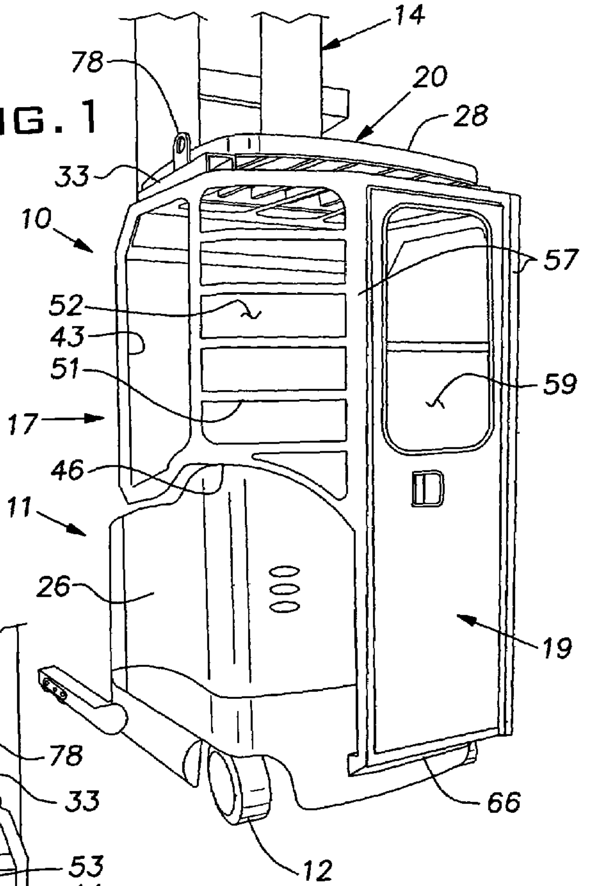
FIG. 1 is a left rear perspective view of a cab constructed in accordance with the invention mounted on a lift truck.
Figure 2:
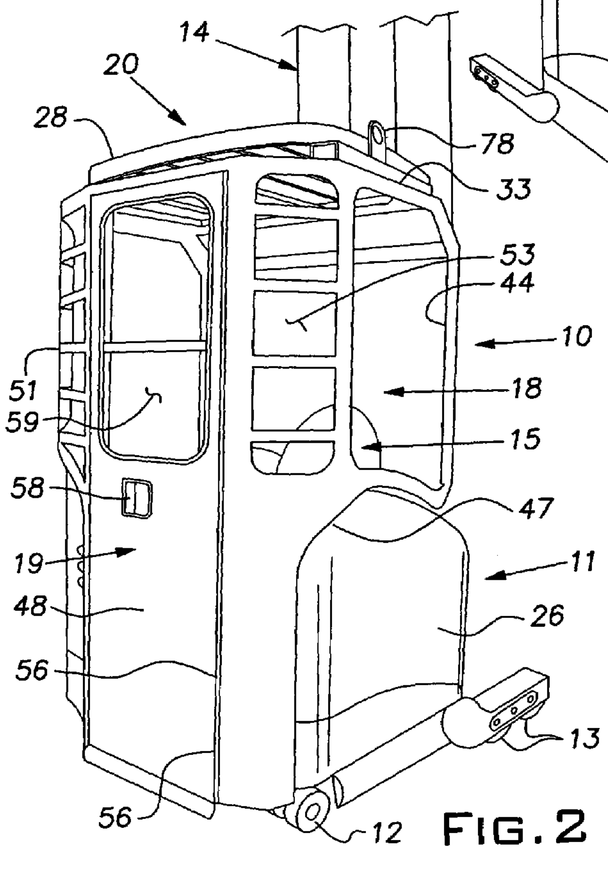
FIG. 2 is a right rear perspective view of the cab and lift truck.
Figure 3:
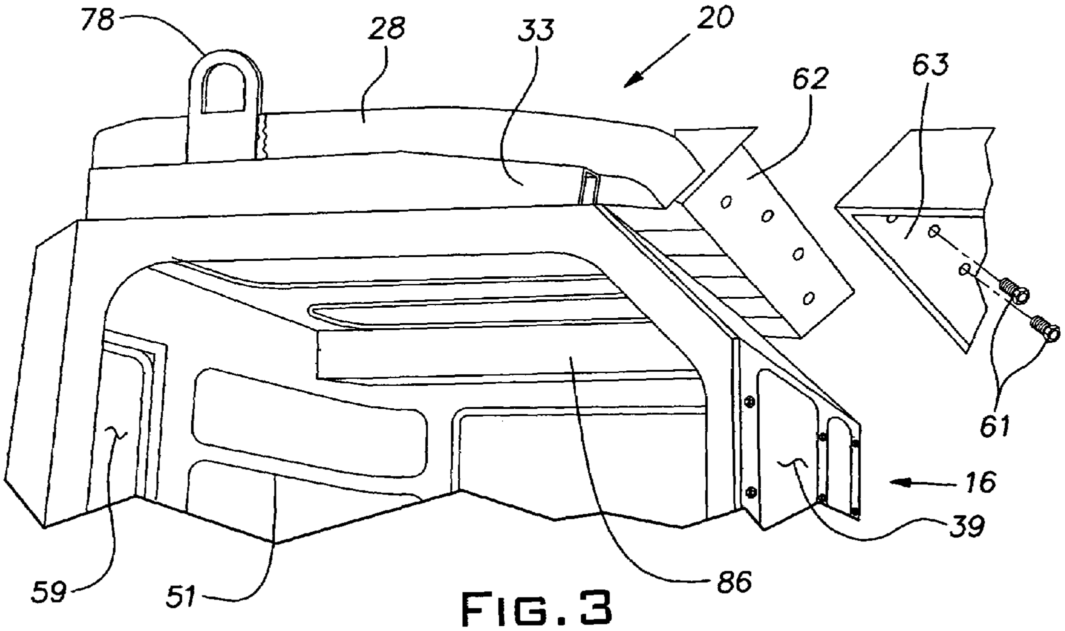
FIG. 3 illustrates the main mounting structure of the cab on the lift truck.

Referring now to the drawings, a cab 10 encloses an operator station 15 on a lift truck 11. The illustrated lift truck 11 is generally conventional in construction being particularly suited for narrow aisle use and being driven by electric motors powered by on-board batteries. The principles of the invention are applicable to other types of lift trucks. The truck 10 has rear, steerable propulsion wheels 12 and front wheels 13, and a mast 14 on which the lift forks are supported for vertical movement and, when a reach truck, for horizontal movement.

Figure 5:
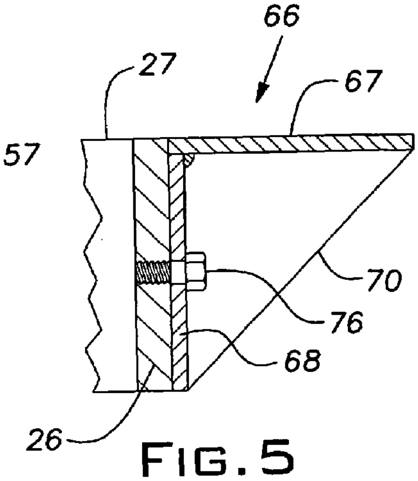
FIG. 5 is a cross-sectional view of the secondary mounting structure taken in the plane 5-5 indicated in FIG. 4.
Figure 6:
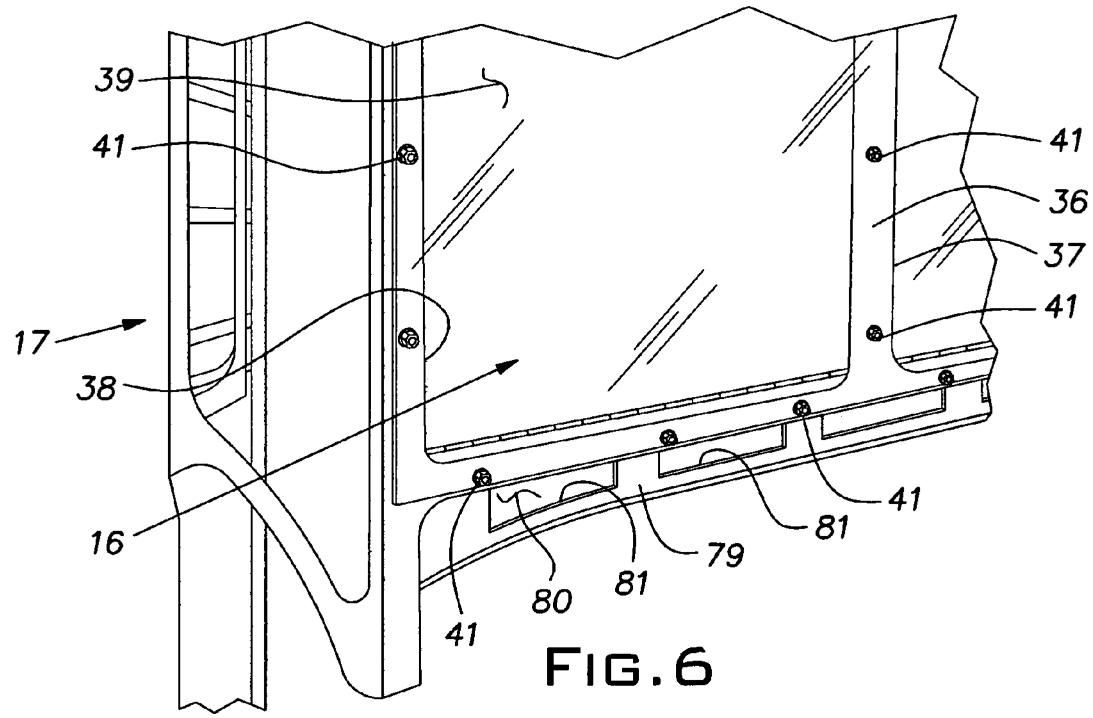
FIG. 6 is a fragmentary perspective view of a portion of the front of the cab.
Figure 7:
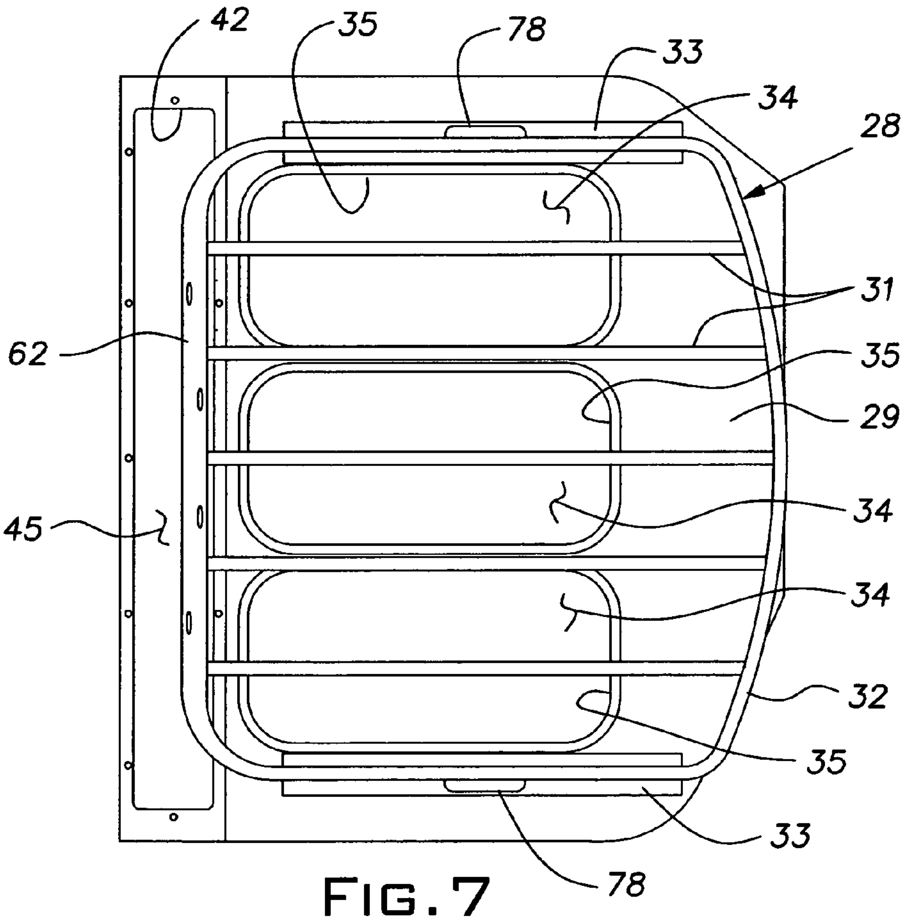
FIG. 7 is a top view of the cab.

The cab 10 has four generally vertical faces 16-19, and a top 20. The illustrated cab is fabricated primarily of hot-rolled steel sheet stock. The front and side faces 16, 17 and 18 extend downwardly from the top or roof 20, roughly ½ of the height or elevation of the cab to a chassis/body 26 of the lift truck 11. The rear face 19 of the cab 10 has a left portion extending downwardly from the top 20 to the level of the bottom of the left face 17 and a right portion that extends downwardly to the level of the floor 27 of the truck (FIG. 5).

The top or roof 20 is a welded assembly of an overhead guard 28 and a roof panel 29 of sheet steel. The guard 28 comprises a set of parallel spaced bars 31 aligned front to back of the cab, i.e. aligned with the longitudinal axis of the truck 11, held within a perimeter frame 32 of steel bar stock. The guard 28, which can be an original equipment part, overlies the operator station 15 to protect the operator from falling objects. The roof panel 29 is fixed to the guard 28 by welding inverted U-shaped brackets 33 between the guard and the panel. The vertical flanges of the U-shaped brackets 33 spread the weight of the cab 10 over a relatively large area of the roof panel 29. This serves to resist premature fatigue failure that might otherwise occur in this welded-up area.

The roof panel 29 is cut out to provide three lights or windows 35 which are individually glazed with transparent sheet material 34, preferably polycarbonate, a plastic. The transparent panels or panes 34 are mounted in conventional extruded elastomeric molding.

The sides 16-19 of the cab 10 are welded to and extend downwardly, in the manner of a curtain, off the periphery of the top panel 29. The contours of the side faces 17, 18 and rear face 19 follow the profile of the top panel 20. The forward portions of the side faces 16, 17 are generally planar, while the rearward portions are curved about vertical axii in the manner of a column. The rear face 19 of the cab is curved at the left and right to merge with the corresponding cab faces 17 and 18. The front face 16 of the cab 10 is generally flat or planar and is formed of sheet metal strips arranged in a rectangular border and in an off center strip 36 dividing the front face into two main window openings or lights 37, 38. A single sheet 39 of transparent material, such as polycarbonate, covers both of the lights 37, 38. The glazing sheet is fixed to the outside of the sheet metal forming the cab front face 16 by screws 41. The front side or face 16 is configured so that the glazing sheet 39 is closely adjacent to the mast 14 to maximize the space afforded to the operator. The bolts or screws 41 enable the sheet to be removed and replaced with less effort than would be needed with traditional extruded rubber molding set into the window cut outs as is conventional.

Figure 11:
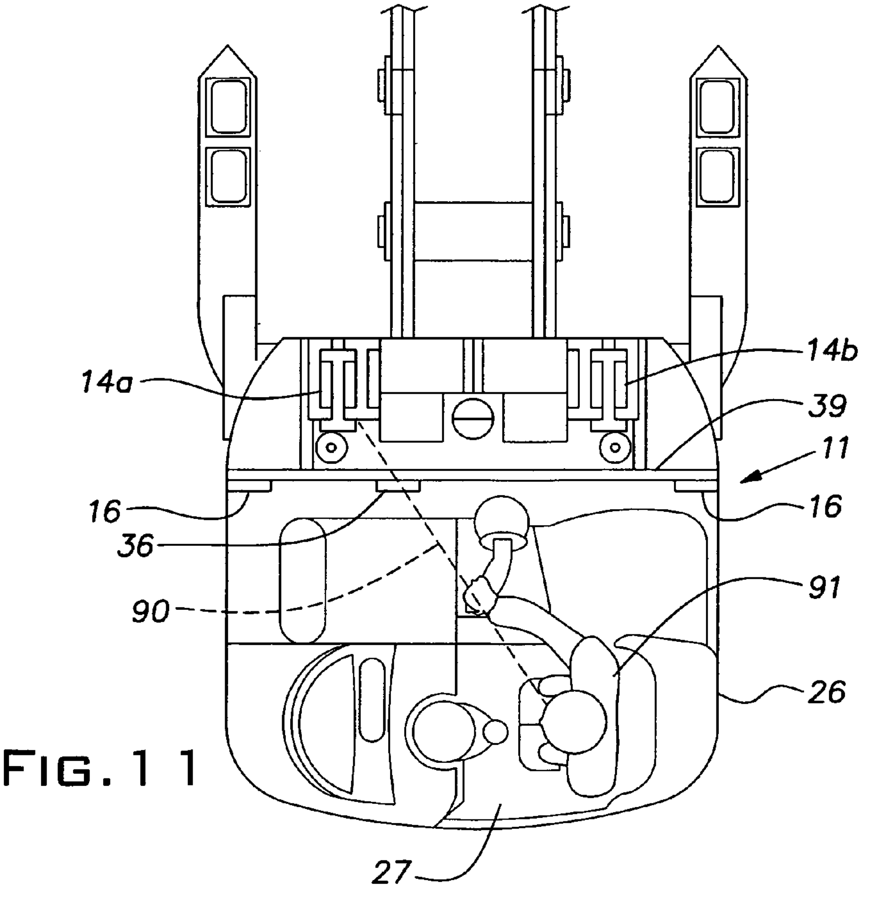
FIG. 11 is a schematic plan view illustrating the relative locations of the truck mast, front window divider, and operator station.

FIG. 11 is a diagrammatic plan view of the lift truck 11 with the front face 16 of the cab 10 shown just behind the mast 14 which has left and right portions 14*a* and 14*b*. FIG. 11 schematically illustrates how the location of the off center or asymmetric front window dividing strip 36 is advantageously located in the line of sight 90 from the operator's station 15 to the left hand mast assembly or column 14*a*. As shown, the operator station 15 is asymmetric relative to the longitudinal centerline of the truck 11. When an operator, diagrammatically shown at 91, looks in the direction of the left mast portion or assembly 14*a* the image of the dividing strip 36 is superimposed on the image of the left mast portion so that the dividing strip avoids a reduction in the field of view forward of the mast 14.

A narrow light 42 at an inclination of about 45° from the horizontal is formed by a cut-out in the roof panel 29 and by bending the surrounding part of the panel downwardly out of the horizontal plane of the main part of the panel. The light or window 42 is glazed with a transparent sheet 45, preferably polycarbonate, attached to the outer surface of the roof panel 29 by screws. The side faces 17, 18, front face 16, and portions of the rear face 19, are fabricated of steel sheet stock welded together and are largely devoid of any heavy angle, channel, or box-type reinforcement. The sides 17, 18 are provided with generous side windows or lights 43, 44 glazed with a transparent sheet material such as polycarbonate. The illustrated windows 43, 44 are fitted with elastomeric moldings for attaching the transparent sheets at the window openings 43, 44. Lower edges 46, 47 of the cab sides or faces 17, 18, are complementary in shape to the upper surfaces of the truck chassis/body and are fitted with suitable weatherstrip material (not shown) to seal against drafts. The rear side or face 19 is asymmetrical with the right portion including a full length door 48, and a left portion descending from the roof panel 29 to an elevation of the adjacent part of the left face 17.

Rounded or wrap-around corners between the sides 17, 18 and rear 19 generally conform to the configuration of the chassis/body in plan view, thus carrying out is "soft" shape. This configuration avoids sharp corners and reduces the risk of injury to personnel or property in the event a corner is accidentally struck. Horizontal strips 51 of sheet metal, widely spaced vertically from one another, wrap around the corners between the side faces 17, 18 and rear face 19. The corners are glazed with transparent flexible sheet stock 52, 53 bent to conform to the respective corner curve. The horizontal strips 51 constrain the transparent window sheets 52, 53, and permit them to be cold formed in place on the inside of the strips 51 to the desired curved shape by constraining this flexible sheet material to the rigid form of the strips 51. This technique avoids the risk of distortion and diminished clarity attendant with hot forming the window material. These rear corner window sheets 52, 53 are held in place by screws or bolts secured to the side and rear sheet metal cab faces.

The door 48 is preferably a weldment of sheet steel with suitable channel or angle along its periphery and/or double wall construction to achieve adequate strength. A vertical piano hinge 56 at the right of the door 48 mounts the door to a door jamb 57. Suitable weatherstripping is provided to seal the door 48 to the jamb 57. A door handle/latch mechanism 58 releasably holds the door 48 against the door jamb 57. A large window 59 glazed with a transparent medium, preferably polycarbonate, takes up most of the upper half of the door to provide generous rear vision for the operator.

Figure 4:
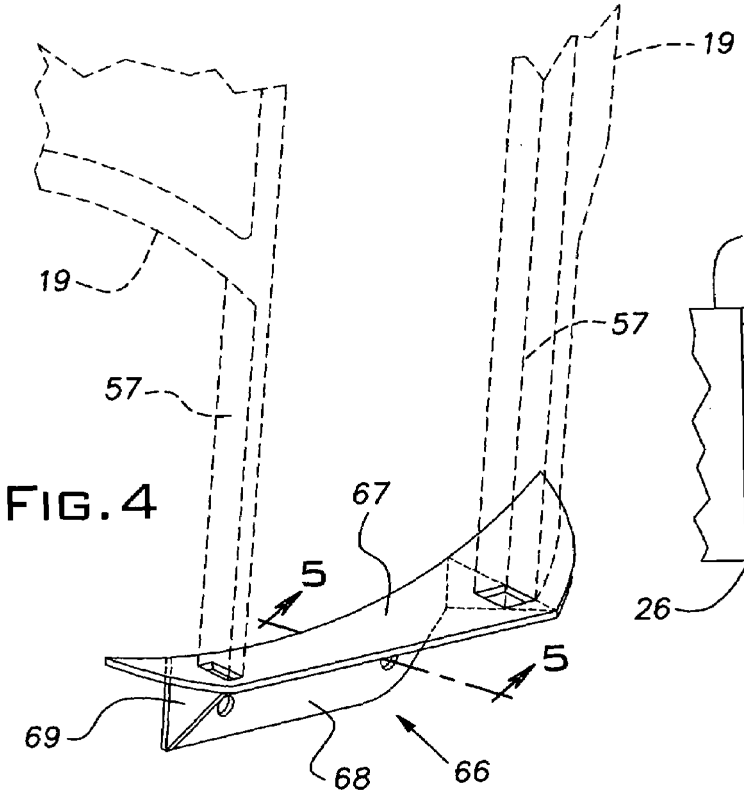
FIG. 4 illustrates secondary mounting structure for mounting the cab on the lift truck.

The guard 28 and, as disclosed, the remaining part of the cab, is rigidly fixed and thereby suspended from the mast 14 by bolts 61 that pass through a front plate 62 of the guard and a bracket 63 welded to the rear of the mast. Note that the front plate 62 is directly abutted against the mast bracket 63. This connection between the guard 28, integrally welded with the remainder of the cab 10, and the mast bracket 63 is sufficiently strong and rigid to support the entire cab 10 enabling the cab faces 16-19 to hang as curtain walls from the top panel or roof 29 and be free of other structural attachments to the truck apart from the auxiliary connection adjacent the bottom of the door jamb 57. With reference to FIGS. 4 and 5, the cab 10 includes a threshold assembly 66 contoured to fit the shape of the truck chassis/body at the foot step entrance to the operator station 15. The threshold assembly 66 is a weldment of steel sheet stock comprising a horizontal step plate 67 and a generally vertical mounting plate 68 braced by gussets 69, 70. Bolts 76 are assembled through holes in the threshold mounting plate 67 into threaded holes in the chassis/body of the truck 11 for fixing the assembly 66 to the chassis/body. The connection of the threshold assembly 66 afforded by the bolts 76 stabilizes the lower end of the cab 10 distal from the mast 14 and preferably is the sole connection between the cab 10 and truck 11 apart from the described mounting of the guard 28 to the mast 14. The box-like structure of the cab walls or faces 16-19 obviates a necessity for otherwise attaching or fixing parts of the cab such as the side faces to adjacent parts of the truck 11. The mast 14 supplies the primary support for the cab 10 and is only supplementarily supported at the threshold assembly 66 remote from the mast attachment. The cab 10 is conveniently assembled onto the truck 11 by temporarily supporting it from above with straps, cables, or the like, coupled to lifting eyes 78, welded on the channels or brackets 33 at the longitudinal center of gravity of the cab 10. With the cab temporarily supported by the lifting eyes 78 so that it hangs in a vertical orientation, the bolts 61 can be assembled in the mast bracket 63 and the bolts 76 in the threshold support plate 68 can be assembled in respective holes thereby accomplishing the mechanical installation of the cab 10 on the truck 11.

Figure 8:
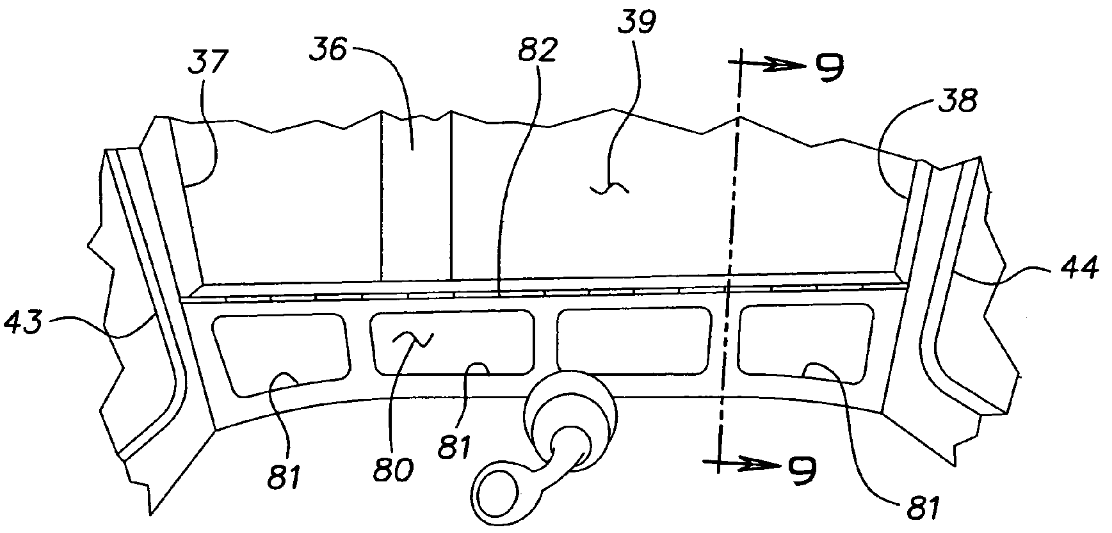
FIG. 8 is a fragmentary perspective view of the lower portion of the front of the cab as viewed from the interior.
Figure 9:
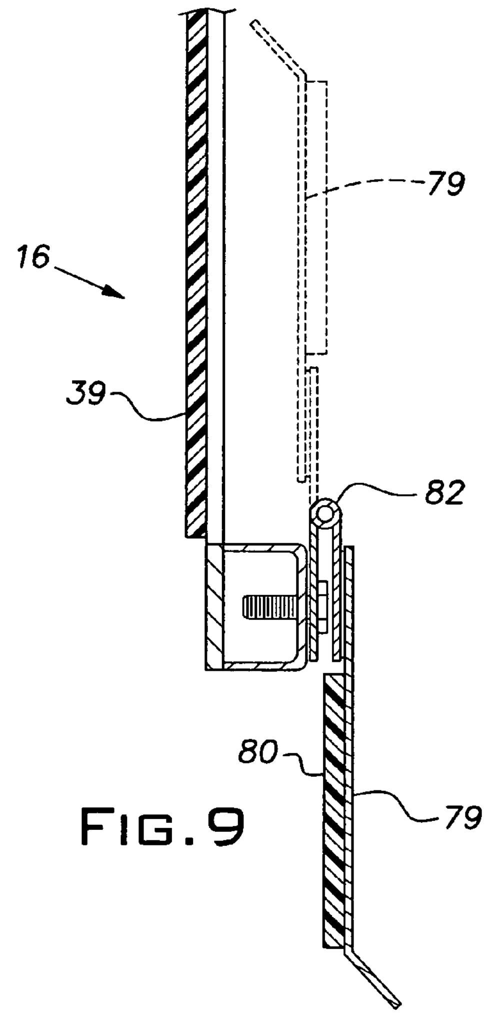
FIG. 9 is a fragmentary cross-sectional view of the lower portion of the cab taken along the lines 9-9 in FIG. 8.

Referring to FIG. 8, a lower part of the front 16 is a hinged sheet metal panel 79 having a plurality of horizontally arrayed cut-outs 81 glazed with a single sheet 80 of transparent material, preferably polycarbonate, screwed to its outer face. The cut-outs or windows 81 provide for visibility towards the floor in front of the lift truck 11. The panel 79 is hinged with a horizontal piano hinge 82, which permits the panel to flip inward towards the interior of the cab and then upward through an arc of approximately 180° to a retracted position, shown in phantom, thereby permitting access to a service area of the lift truck control system. This pivotal retraction of the lower panel 79 is accomplished without tools in a quick flip-up motion, thereby facilitating inspection, diagnosis, and/or repair of underlying parts of the lift truck.

Figure 10:
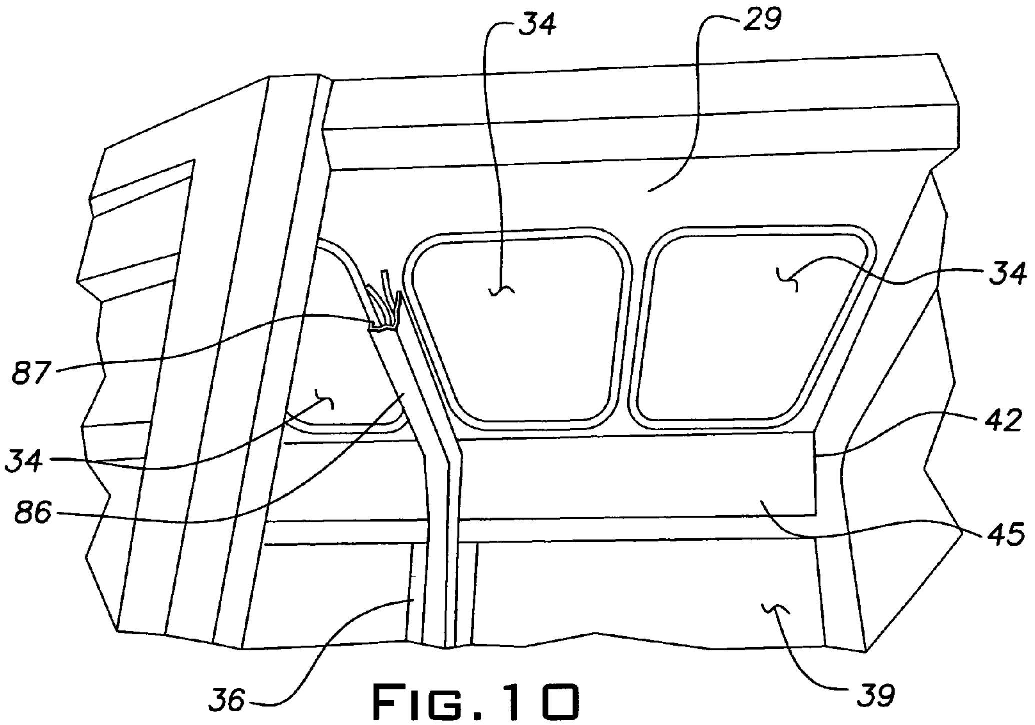
FIG. 10 is a perspective view of a portion of the inside upper front part of the cab.

FIG. 10 illustrates the relationship of the front window off-center dividing strip 36 and its integration with an electrical raceway 86 that runs along the roof panel 29 between two of the roof lights. As shown in the broken-away area of the raceway 86, the raceway cross-section is J-shaped with a gap 87 at one side to permit assembly of control wires for fans and heaters, for example. It will be seen that the raceway 86 is conveniently in vertical alignment with the off-center strip 36, thereby allowing the control wires to conveniently be contained in a vertical raceway 88 attached to the inside surface of the off-center strip.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A lift truck cab for enclosing the operator station and thereby protecting the operator from the environment in which the truck operates, the cab having front, side, and rear faces, and a roof, mounting structure attached to the roof for suspending the cab from a mast of the lift truck such that the cab underlies and remains protected by an overhead guard rigidly fixed to the mast and in a manner that permits the front and side faces when installed on the truck to be hung in the manner of curtains, without the necessity of direct fastening of lower portions of the front and side faces to the chassis/body of the truck.

2. A cab as set forth in claim 1, wherein the front face includes a lower panel hinged to an upper front face portion, the lower panel being pivoted about a generally horizontal axis adjacent a lower side of the upper front face portion into the cab and then above its normal use position to afford access to parts of the lift truck.

3. A lift truck cab for enclosing the operator station and thereby protecting the operator from the environment in which the truck operates, the cab having front, side, and rear faces, and a roof, mounting structure attached to the roof for suspending the cab from a mast of the lift truck in a manner that permits the front and side faces when installed on the truck to be hung in the manner of curtains, without the necessity of direct fastening of lower portions of the front and side faces to the chassis/body of the truck, wherein the rear face includes a door and a jamb for the door, the jamb including a threshold at a bottom of the door, the jamb being adapted to be fixed to the chassis/body of the truck to provide auxiliary mounting of the cab on the truck apart from the mounting structure associated with the mast.

4. A lift truck cab for enclosing the operator station and thereby protecting the operator from the environment in which the truck operates, the cab having front, side, and rear faces, and a roof, mounting structure attached to the roof for suspending the cab from a mast of the lift truck in a manner that permits the front and side faces when installed on the truck to be hung in the manner of curtains, without the necessity of direct fastening of lower portions of the front and side faces to the chassis/body of the truck, wherein the roof has a plurality of windows spaced in a lateral direction from one another, and the front face has windows spaced horizontally from one another, the space between a pair of said front face windows being aligned with a space between a pair of roof windows in a common vertical plane, and an electrical raceway within the cab extending along the roof and the front face in said vertical plane.

5. A cab as set forth in claim 4, wherein said common vertical plane is offset from the center of the front face of the cab whereby said raceway is situated in a line of sight to a vertical column of said mast from an operator station laterally offset from the center of the cab and thereby avoids significant restriction of the vision afforded the operator beyond the restriction imposed by said mast.

6. A lift truck cab for enclosing the operator station and thereby protecting the operator from the environment in which the truck operates, the cab having front, side, and rear faces, and a roof, mounting structure attached to the roof for suspending the cab from a mast of the lift truck in a manner that permits the front and side faces when installed on the truck to be hung in the manner of curtains, without the necessity of direct fastening of lower portions of the front and side faces to the chassis/body of the truck, constructed such that when the mounting structure is attached to the mast, the front face is closely adjacent the mast, said front window being glazed with a transparent plastic sheet attached to adjacent structural parts of the cab with screws assembled through holes in said plastic sheet material.

7. A lift truck and a cab, the lift truck having a mast for lifting a load, the cab being supported by the mast, the cab having front, side and rear faces, the front face being closely adjacent the mast, the front face comprising sheet metal structure bordering a window and a transparent plastic sheet glazing the window, the transparent plastic sheet being mounted on the outer side of the sheet metal structure, the plastic sheet being secured in place by screws assembled through the plastic sheet and sheet metal structure.

8. A lift truck and cab combination, the lift truck having a mast for lifting a load, the cab being supported by the mast, the cab having front, side and rear faces, the front face being adjacent the mast, the front face comprising a sheet metal structure bordering a window and a transparent plastic sheet on the sheet metal structure, the front face having a lower panel below said window, said lower panel being hinged on the cab adjacent an upper edge thereof for pivotal movement from a generally vertical operational position upwardly to a generally vertical retracted position.

9. A combination cab as set forth in claim 8, wherein the front face is devoid of structure in an area between said sides and below said lower panel when said lower panel is in said operational position.

* * * * *